Oct. 2, 1962 W. R. SMITH ET AL 3,056,536
BATTERY CARTON
Filed April 20, 1959
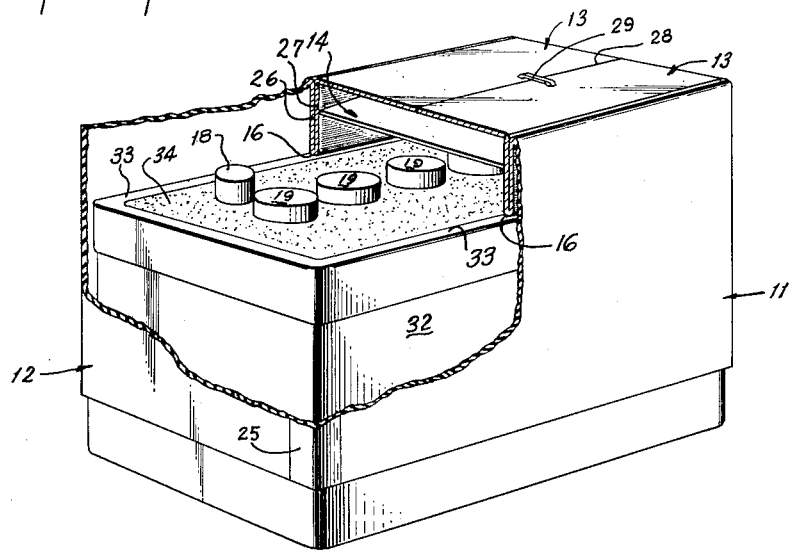
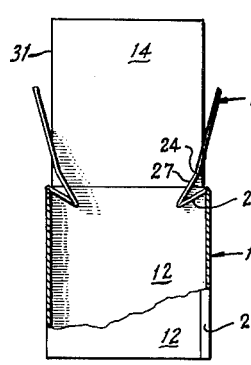
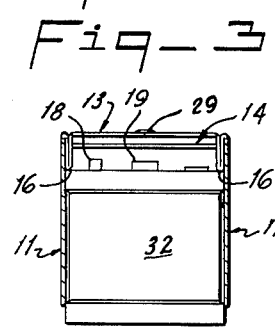
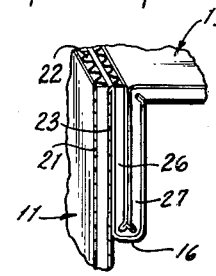
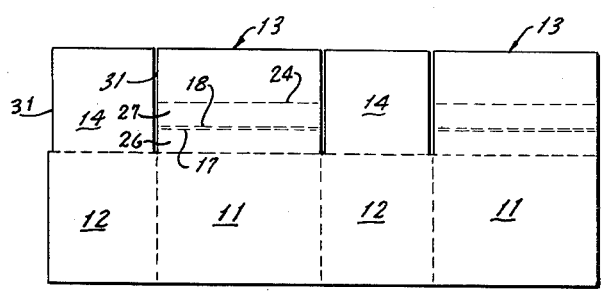
INVENTORS
WALTON R. SMITH
NATHAN F. HELPER
BY
*A. Schapp*
ATTORNEY

United States Patent Office 3,056,536
Patented Oct. 2, 1962

3,056,536
BATTERY CARTON
Walton R. Smith, San Francisco, and Nathan F. Helper, San Mateo, Calif., assignors to States Batteries, Inc., San Francisco, Calif., a corporation of California
Filed Apr. 20, 1959, Ser. No. 807,648
3 Claims. (Cl. 229—14)

This invention relates to improvements in a battery carton, and more particularly to cartons used as protective cover for protecting the filler caps and terminals of automative type storage batteries during shipping.

The filler caps, which are commonly made of plastic, and the lead terminals must be protected from the weight of other batteries resting upon them. For this purpose, pasteboard protective cartons have long been used. These cartons ordinarily have one or more flanges depending from the carton top and resting upon the top of the battery between the filler caps, the flanges providing support for the next battery above.

With the advent of the twelve volt battery, the requirements for these cartons changed. The upper surface of the new batteries, between the upper edges of the casing walls, are covered with a special compound to protect the cell connectors from arcing over. This compound is rather soft and is easily marred by the supporting flanges of the conventional protective carton.

The present invention contemplates a battery carton which is formed with shoulders adapted to be supported on the upper edges of the hard casing walls only, never coming in contact with the soft middle portion.

Previous attempts to provide such a carton have resulted in devices which either did not effectively perform the desired function due to the shoulders moving inwardly from the carton walls and marring the soft portion, or, where a spreading means has been employed, the pattern layout was too wasteful of material.

It is, therefore, a principal object of the present invention to provide a protective carton for batteries in which the weight of the carton, and of objects supported thereon, will bear upon the casing walls of the battery and not upon the portions lying between the walls.

Another object of the present invention is to provide a battery carton in which the usual side flaps are folded in a novel manner to provide a supporting shoulder spaced from the top of the carton and running the side walls thereof.

A further object of the present invention is the provision of a battery carton of the character described which may be formed from a single rectangular blank without waste of the corrugated board material.

It is further proposed to provide a battery carton of the character described in which a spreading action is exerted along substantially the entire length of the supporting shoulders, and in which the carton may be stapled together with conventional equipment and in a conventional manner.

Furhter objects and advantages of our invention will be apparent as the specification progresses, and the new and useful features of our battery carton will be fully defined in the claims attached hereto.

The preferred form of our invention is illustrated in the accompanying drawing forming part of this application, in which:

FIGURE 1 is a perspective view, partially broken away, of a battery carton constructed in accordance with the present invention and shown mounted in protective position on a battery;

FIGURE 2, a cross-sectional view of the battery carton during the preliminary folding step of its manufacture;

FIGURE 3, a cross-sectional view of the completed carton mounted on a battery;

FIGURE 4, a plan view showing the layout of the blank of corrugated board which is formed into the battery carton; and FIGURE 5, an enlarged fragmentary sectional view of an upper corner portion of the view of FIGURE 3.

While we have shown only the preferred form of our invention, it should be understood that various changes or modifications may be made within the scope of the claims hereto attached, without departing from the spirit of the invention.

Referring to the drawing in detail, the carton of the present invention consists of rectangularly related side and end walls 11 and 12, a side flap 13 extending along the upper edge of each of the side walls 11, and an end flap 14 extending along the upper edge of at least one of the end walls 12.

In accordance with the present invention, the side flaps 13 are scored for double fold to provide a carton supporting shoulder 16 running along each of the side walls 11 a spaced distance below its upper edge.

To prepare the side flaps 13 for the double fold, a score line 17 is formed on the upper surface of the flap parallel to, and a spaced distance from, the juncture of the flap and the side wall. This distance should somewhat exceed the height of the battery terminals 18 and/or the filler caps 19.

A second score line 18 is formed parallel to and spaced from score line 17 by approximately twice the thickness of the corrugated board material used. The juncture between the side flaps 13 and the side walls 11 is cut through the outer face 21 of the material and through the corrugations 22, leaving the inner face 23 intact, see FIGURE 1.

A third score line 24 is formed parallel to and spaced from score line 18 by the same distance as the spacing between line 17 and the juncture of the side flap 13 with side wall 11.

It will be noted that no bottom is provided in the carton, as shown, the carton's lower edges terminating above the bottom of the battery case. This open bottom structure is prescribed by shipping regulations pertaining to lead-acid storage batteries. For use where a bottom is required, it may be formed in the conventional manner.

To assemble the protective carton of the present invention, the side and end walls are formed into a rectangle and are secured along the corner by gummed tape 25. A double fold is then made in each of the side flaps 13. The area 26 between the juncture with the side walls 11 and the score line 17 is folded 180° into the carton so as to lie against the inner side of the wall 11.

The flap 13 is then bent upwardly 90° around each of the score lines 18 and 24 so that the portion 27 therebetween lies against the portion 26. This provides the shoulder 16 which will rest on the battery casing walls in the manner shown in FIGURE 3.

The flap 13 is then bent 90° in the opposite direction around the score line 24 and extends therefrom horizontally toward the opposite flap 13. The flaps 13 are proportioned so that their outer edges will abut along the centerline 28 of the carton where they may be secured together in a conventional manner, as by staples 29.

Prior to the bending of the flaps 13 around score line 24, the end flaps 14 are bent down and pressed between the double folded portions of flaps 13 to the position shown in FIGURE 1. The lateral stiffness of the flaps 14 serves to bind them in place and force the double folded portions firmly against their respective side walls 11, thus positively positioning the shoulders 16 against spreading away from the walls.

In this connection, it is noted that the end flaps 14 are cut back slightly along their sides 31 in order to accommodate the thickness of the double folded portions 26 and 27 without bowing the sides of the carton outwardly.

With the carton fitted down over the battery 32, in the manner shown in FIGURES 1 and 3, the shoulders 16 will rest upon and be supported by the side walls 33 of the battery casing, and, because of the spreading action of the end flaps over their length, the shoulders 16 cannot rest upon and mar the soft compound 34.

It will be noted from a study of FIGURE 4 that the present carton requires a rectangular blank of material, the side flaps 13 and end flaps 14 being of the same length. This will effect a substantial saving of material over a carton which has flaps of different length, and is, therefore, a valuable feature of the present invention. This rectangular aspect will hold true for any rectangular battery.

We claim:

1. A protective cover for a rectangular object, comprising side and end walls defining a rectangular carton, a side flap extending along the upper edge of each of said side walls, said side flaps being scored for a double fold to provide a carton-supporting shoulder running along the inner side of each side wall a spaced distance below its upper edge, and an end flap extending along the upper edge of one of said end walls and having a width slightly less than that of the end wall for positioning between the double folded side flaps to a desired depth intermediate the upper edges of the side walls and said shoulders, said end flap having a width sufficient to press said shoulders against their respective sidewalls over substantially their entire length, the end flap being held in such position by the resilient tendency of the double folded flaps to unfold.

2. A protective cover for a battery having rectangular casing walls surrounding a relatively soft top, comprising rectangularly related side and end walls formed of corrugated pasteboard, a side flap extending along the upper edge of each of said side walls, each of said side flaps having a scored line parallel to the juncture with the side wall and spaced therefrom by a distance exceeding the height of a battery filler cap above its case, a second score line on each of said side flaps parallel to and spaced from the first-named score line by said distance whereby said side flaps may form a double fold passing down against the side wall thence vertically back up and across the top of the protective cover so as to provide a downwardly facing shoulder adjacent to the side wall of the carton and adapted to bear upon the upper edges of the side walls of the battery casing, and end flaps extending along the upper edge of each of said walls and made of a width for bending down to extend at a downward slant between said double folds intermediate said score lines, said end flaps having a length extending to at least the central region of the protective cover and having a width sufficient to press said shoulders against the adjacent side walls at said central region, the end flaps being held in such position by the tendency of the double folded flaps of corrugated pasteboard to unfold.

3. A protective cover for a rectangular object comprising side and end walls defining a rectangular carton, side flaps extending along the upper edges of each of said side walls, said side flaps being scored for folding downwardly into the carton and up again to provide carton-supporting downwardly presented shoulders running along each side wall a spaced distance below the upper edge, and end flaps hinged to the upper edges of the end walls and foldable into the carton to a desired depth and at a desired downward slant, the end flaps being of a width to crowd the double folds against the side walls and to firmly position the shoulders adjacent the side walls, and being of a length to meet halfway the length of the carton, and the side flaps having additional score lines at the top elevation of the carton to allow projecting portions of the side flaps to fold upon the end flaps, and the side flaps being of a width to have their free edges meet midway of the width of the carton.

References Cited in the file of this patent

UNITED STATES PATENTS

| | | |
|---|---|---|
| 2,179,830 | Pfundstein | Nov. 14, 1939 |
| 2,671,599 | Price | Mar. 9, 1954 |
| 2,713,964 | Repking | July 26, 1955 |
| 2,779,527 | Fallert | Jan. 29, 1957 |
| 2,878,984 | Welshenbach | Mar. 24, 1959 |

FOREIGN PATENTS

| | | |
|---|---|---|
| 14,546 | Australia | July 20, 1929 |